US012798299B2

(12) United States Patent
Clement et al.

(10) Patent No.: US 12,798,299 B2
(45) Date of Patent: Nov. 17, 2026

(54) OPTIMIZED ARCHITECTURE OF A CIVIL ENGINEERING TIRE

(71) Applicant: COMPAGNIE GENERALE DES ETABLISSEMENTS MICHELIN, Clermont-Ferrand (FR)

(72) Inventors: Emmanuel Clement, Clermont-Ferrand Cedex (FR); Simona Ceccia, Clermont-Ferrand Cedex (FR); Cathie Rivoire, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/864,327

(22) PCT Filed: May 4, 2023

(86) PCT No.: PCT/EP2023/061770
§ 371 (c)(1),
(2) Date: Nov. 8, 2024

(87) PCT Pub. No.: WO2023/217622
PCT Pub. Date: Nov. 16, 2023

(65) Prior Publication Data

US 2025/0303798 A1 Oct. 2, 2025

(30) Foreign Application Priority Data

May 9, 2022 (FR) ....................................... 2204346

(51) Int. Cl.

| | |
|---|---|
| ***B60C 11/00*** | (2006.01) |
| ***B60C 1/00*** | (2006.01) |
| ***B60C 11/04*** | (2006.01) |

(52) U.S. Cl.
CPC .......... *B60C 11/005* (2013.01); *B60C 1/0016* (2013.01); *B60C 11/0008* (2013.01);
(Continued)

(58) Field of Classification Search
CPC ... B60C 11/005; B60C 11/04; B60C 11/0016; B60C 11/0008
See application file for complete search history.

(56) References Cited

U.S. PATENT DOCUMENTS

| | | | | |
|---|---|---|---|---|
| 2004/0261926 A1* | 12/2004 | Ozel | B60C 11/005 | 152/209.5 |
| 2012/0298271 A1* | 11/2012 | Bijaoui | B60C 11/005 | 152/209.25 |
| 2021/0146728 A1* | 5/2021 | Baranger | B60C 11/0323 | |

FOREIGN PATENT DOCUMENTS

| | | |
|---|---|---|
| WO | 2015182078 A1 | 12/2015 |
| WO | 2016202763 A1 | 12/2016 |

(Continued)

OTHER PUBLICATIONS

"Carbon Black." Globus Rubchem Pvt Ltd. 2021. [retrieved on Sep. 17, 2025] Retrieved from the Internet: <URL: <https://globusrubchem.com/product/carbon-black/>. (Year: 2021).*

(Continued)

*Primary Examiner* — Robert C Dye
(74) *Attorney, Agent, or Firm* — COZEN O'CONNOR

(57) ABSTRACT

A radial tire having a rim diameter at least equal to 24 inches and a nominal load at least equal to 8000 kg for a mining vehicle, having a tread (22) of radial thickness E at least equal to 0.04 times the outer radius of the tire. The tread has two rubber compositions, making up at least 90% of the thickness E. The first composition (221), radially on the inside of the second (222), makes up at least 40% and at most 66% of the thickness E; it has a secant modulus at 10% strain, at 23° C., greater than 5.2 MPa, an elongation at break (Continued)

at 100° C. greater than 500%, and a maximum dynamic loss at 100° C. and 10 Hz greater than 0.13. The proportion by weight, expressed in phr, of filler of the second composition is greater than that of the first composition.

10 Claims, 1 Drawing Sheet

(52) U.S. Cl.
CPC ................. *B60C 2011/0025* (2013.01); *B60C 2011/0033* (2013.01); *B60C 2200/065* (2013.01); *C08K 2201/006* (2013.01)

(56) References Cited

FOREIGN PATENT DOCUMENTS

| | | | | | |
|---|---|---|---|---|---|
| WO | 2018104671 | A1 | | 6/2018 | |
| WO | WO-2019058084 | A1 | * | 3/2019 | ............. B60C 11/04 |

OTHER PUBLICATIONS

ASTM. Designation: D1765-99b. "Standard Classification System for Carbon Blacks Used in Rubber Products." Published Jul. 1999. (Year: 1999).*
English machine translation of WO2019058084A1. (Year: 2019).*

* cited by examiner

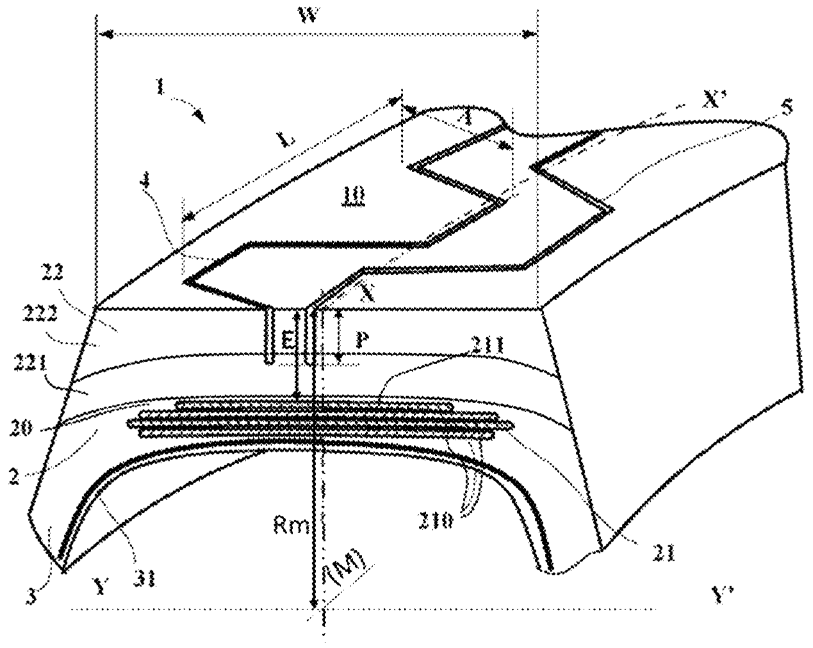
W
1
L
A
X'
5
4
10
X
22
222
E
P
211
221
20
2
Rm
210
21
3
Y
31
(M)
Y'

OPTIMIZED ARCHITECTURE OF A CIVIL ENGINEERING TIRE

RELATED APPLICATIONS

This is a U.S. National Phase Application under 35 USC 371 of International Application PCT/EP2023/061770 filed on May 4, 2023.

This application claims the priority of French application no. FR 2204346 filed May 9, 2022, the entire content of all of which is hereby incorporated by reference.

FIELD OF THE INVENTION

The subject of the present invention is a radial tire intended to be fitted to a heavy-duty vehicle of civil engineering type, and more particularly for underground mines, and relates more particularly to the tread of such a tire.

BACKGROUND OF THE INVENTION

Radial tires intended to be fitted to a heavy-duty vehicle of civil engineering type for underground mines are designated as such within the meaning of the European Tire and Rim Technical Organisation, or ETRTO, standard.

For example, a radial tire for a heavy-duty vehicle of civil engineering type, within the meaning of the European Tire and Rim Technical Organisation, or ETRTO, standard, is intended to be mounted on a rim with a diameter at least equal to 25 inches and for a nominal load at least equal to 8000 kg.

Since a tire has a geometry exhibiting symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire, and perpendicular to the meridian plane, respectively. The circumferential direction is tangential to the circumference.

Hereinafter, the expressions “radially inner” or “radially on the inside” and “radially outer” or “radially on the outside” mean “closer to the axis of rotation of the tire” and “further away from the axis of rotation of the tire”, respectively. “Axially inner” or “axially on the inside” and “axially outer” or “axially on the outside” mean “closer to the equatorial plane of the tire” and “further away from the equatorial plane of the tire”, respectively, the equatorial plane of the tire being the plane that passes through the middle of the tread surface and is perpendicular to the axis of rotation.

Generally, a tire comprises a tread intended to come into contact with the ground via a tread surface, the two axial ends of which are connected via two sidewalls to two beads that provide the mechanical connection between the tire and the rim on which it is intended to be mounted.

A radial tire additionally comprises a reinforcement, made up of a crown reinforcement radially on the inside of the tread and a carcass reinforcement radially on the inside of the crown reinforcement.

The carcass reinforcement of a radial tire for a heavy-duty vehicle of civil engineering type usually comprises at least one carcass layer comprising generally metallic reinforcers that are coated in a polymeric material of the elastomer or elastomeric type that is obtained by blending and is known as a coating compound. A carcass layer comprises a main part, joining the two beads together and generally wrapped, in each bead, from the inside to the outside of the tire around a generally metallic circumferential reinforcing element known as a bead wire so as to form a turn-up. The metal reinforcers of a carcass layer are substantially parallel to one another and form an angle of between 80° and 90° with the circumferential direction.

The crown reinforcement of a radial tire for a vehicle of civil engineering type comprises a superposition of crown layers extending circumferentially, radially on the outside of the carcass reinforcement. Each crown layer is made up of generally metallic reinforcers that are parallel to one another and coated in a polymeric material of the elastomer or coating compound type.

The tread of tires for underground mines have very specific use conditions. Driving the tires down to the bottom of the mine and changing them are expensive and complex operations that must be limited. For the tread, it is therefore necessary to provide the user with the maximum volume of rubber configured to be in contact with the ground or maximum volume of wearable rubber so as to limit these operations. This is especially the case as the tires used in underground mines are subjected to severe and repeated attacks. Furthermore, for safety reasons, the speed in underground mines is limited, and the presence of a tread pattern for discharging water or increasing grip is not advantageous. For this extreme use, tire manufacturers therefore use treads which are smooth and very thick in relation to the diameter of the casing.

Having a maximized volume of wearable rubber is not enough to optimize the duration of use of the tire from a wear perspective. Some rubber compounds have demonstrated good attack-resistance performance in this use. Thus, the use of synthetic compounds in the tread makes it possible to significantly increase the attack resistance. All these technical solutions result in increasing the temperature of, and promoting the formation of pockets inside, the tread. Depending on their size, these pockets can lead to the loss of part of the tread, which leads to failure of the tire. The expression “rubber compound” or “rubber composition” denotes a composition of rubber comprising at least an elastomer and a filler.

One solution is to slow down the operating speed of the vehicle, but this adversely affects the mining capacity. To improve this productivity, manufacturers have proposed combining two rubber compounds, one of low hysteresis, radially on the inside of a wearable rubber compound, and a siped tread for cooling this thick tread (WO2019/058084). This solution has effectively made it possible to improve performance but not sufficiently so, such that these tires suffer from problems of chunking of part of the tread at speeds permissible for safety in the mine.

SUMMARY OF THE INVENTION

The inventors have set themselves the aim of increasing the resistance to chunking of part of the tread for a radial tire for a vehicle of the mining civil engineering type.

This aim has been achieved by a radial tire for a mining vehicle, intended to be mounted on a rim having a rim diameter at least equal to 24 inches and to bear a nominal load at least equal to 8000 kg, comprising:

- a tread intended to come into contact with the ground via a tread surface and connected by two sidewalls to two beads intended to come into contact with the rim,
- a crown reinforcement, radially on the inside of the tread, comprising crown layers, comprising metallic reinforcers,

- a median plane, which is perpendicular to the axis of rotation of the tire, passes through the middle of the tread, and has intersection points with the tread surface that are at a mean distance from the axis of rotation of the tire equal to Rm,
- the tread having an axial width and having, in the median plane, a radial thickness, defined as the radial distance from the radially outermost point of the radially outermost crown layer to the tread surface, the radial thickness E of the tread being at least equal to 0.04*Rm,
- the tread comprising at least a first rubber composition and a second rubber composition, making up at least 90% of the thickness of the tread,
- the first rubber composition being radially on the inside of the second rubber composition,
- the second rubber composition having a secant tensile modulus E10_2, measured at 10% strain and at a temperature of 23° C., at least equal to 5.2 MPa,
- the first rubber composition makes up at least 40% and at most 66% of the thickness of the tread, and preferably at least 45% and at most 60% of the thickness of the tread,
- the elongation at break at 100° C. of the first rubber composition is at least equal to 500%, and the maximum dynamic loss tan δ of said first rubber composition, measured at a temperature of 100° C. and a frequency of 10 Hz, is at most equal to 0.13,
- the first rubber composition comprises a proportion by weight of reinforcing filler at least equal to 30 phr (parts of filler for 100 parts of elastomer) and at most equal to 80 phr,
- the second rubber composition comprises carbon black having a proportion by weight at least equal to 30 phr and at most equal to 75 phr,
- the total proportion by weight of reinforcing fillers of the second rubber composition is greater than the total proportion by weight of reinforcing fillers of the first rubber composition.

The mining tires in question have the particular feature of having a thick tread when the tire is new, with a very low void ratio when the tire is new or when the tire is worn. Since the tread has an axial width W and has, in the median plane, a radial thickness E equal to the radial distance from the radially outermost point of the radially outermost crown layer to the tread surface, the radial thickness E of the tread is at least equal to 0.04*Rm, this corresponding, for the targeted sizes, to radial thicknesses of the tread when the tire is new of greater than 55 mm and up to 120 mm for certain sizes. The void ratio by area is calculated by estimating the surface area of the voids, grooves, sipes present in the tread surface when the tire is new expressed relative to the total surface area of the tread, which corresponds to the axial width of the tread multiplied by the perimeter of the tire. For tires with a circumferentially variable axial width of the tread, the mean axial width can be taken and for tires having an axially variable perimeter, the mean perimeter will be taken to calculate the tread surface area. The void ratio of such tires is often zero. Such a void ratio by area makes it possible to decrease the temperature within the tread without adversely affecting the volume of wearable rubber.

The tread essentially comprises two rubber compounds or rubber compositions making up at least 90% of the thickness of the tread. "Making up at least 90% of the thickness of the tread" is understood to mean that, on a meridian section, the mean radial thickness in the axial direction of the second composition plus the mean radial thickness in the axial direction of the first rubber composition is greater than 90% of the mean radial thickness in the axial direction of the tread. At a given axial distance from the median plane, comprised between the axial ends of the radially outermost layer of reinforcers of the crown reinforcement, on a meridian section, the radial thickness of the tread is measured from the radially outermost point of the radially outermost reinforcing layer of the crown reinforcement to the point of the tread surface. The thickness of the coating rubber of the radially outermost reinforcer is negligible in relation to the thickness of the tread. For the points which have an axial distance to the median point that is greater than the axial half-width of the radially outermost layer of reinforcers, the thickness of the tread is calculated as the radius of the tread surface at this axial distance from the median plane minus the radius from the axially outermost point of the radially outermost points of the radially outermost reinforcing layer of the crown reinforcement.

There may be other rubber compositions in the tread, for example a fine rubber composition allowing the adhesion of the first rubber composition to the coating compound of the radially outermost layer of the crown reinforcement, or a layer of rubber composition enabling a better bond between the two main rubber compositions of the tread which together represent at least 90% and preferably 99% of the thickness of the tread.

For good abrasion resistance, it is necessary for the second rubber composition, being radially on the outside of the first rubber composition, to have a secant tensile modulus E10_2 at 10% strain, measured at 23° C. at least equal to 5.2 MPa, on a test specimen taken on the cured tire. The rubber compositions have tensile moduli usually measured in accordance with the ASTM D 412 standard on test specimens manufactured for the test. Those skilled in the art will know how to select and adapt the dimensions of the test specimen depending on the accessible and available quantity of compound in the case where test specimens are taken from the tire for this measurement and for all of the measurements on the materials.

To improve the operation of the tire, it is also necessary for there to be a particular balance between the second rubber composition and the first rubber composition, since experience has shown that outside of these ranges, the solution was not optimum as regards the performance in terms of cracking of the rubber compositions of the tread or the performance in terms of wear. To optimally balance the performance properties, the first rubber composition makes up at least 40% and at most 66% of the thickness of the tread, preferably at least 45% and at most 60% of the thickness of the tread.

To reach an optimum balance, it is also necessary for the first rubber composition to generate little elevation in temperature when the tire is running and therefore for its maximum dynamic loss tan δ, at a temperature of 100° C. and a frequency of 10 Hz, to be at most equal to 0.13. The rubber compositions have dynamic losses usually measured in accordance with the ASTM D 5992-96 standard on test specimens manufactured for the test. Those skilled in the art will know how to select and adapt the dimensions of the test specimen depending on the accessible and available quantity of compound in the case where test specimens are taken from the tire for this measurement and for all of the measurements on the materials. It is also necessary for its cracking resistance to be high and more specifically for the elongation at break at 100° C. of the first rubber composition of the tread to be at least equal to 500%, preferably at least equal to 575%. The rubber compositions have elongations at break usually measured in accordance with the NFT 46 0002 standard on test specimens manufactured for the test. Those skilled in the art will know how to select and adapt the dimensions of the test specimen depending on the accessible and available quantity of compound in the case where test specimens are taken from the tire for this measurement and for all of the measurements on the materials.

To achieve the aims of the invention, a balance must be found between the second rubber composition being able to exchange further heat energy with the exterior in particular, since it is in contact with the exterior air via the tread surface, and having a better performance in terms of wear, being radially on the outside of the first rubber composition. This is because the second rubber composition exchanges heat energy more easily with the exterior since it is in contact with the exterior via the tread surface and not solely via the axial edges of the tread, like the first rubber composition is. Furthermore, since it is radially on the outside of the first rubber composition, for the same forces exerted on the tire via the tread surface, the second rubber composition is displaced further, and thus at the end of the contact patch it slides over a greater length and thus tends to wear to a greater extent, even if its composition is intended to avoid this problem. For this reason, the proportion by weight expressed in phr of total reinforcing filler of the second composition is greater than the proportion by weight expressed in phr (parts of filler for 100 parts of elastomer) of filler of the first composition. Reinforcing filler is understood to mean either carbon black or silica.

Given the percentage by radial thickness of the tread of the first composition, it is clear that this rubber composition must be configured to, once the second rubber composition becomes worn, have a good performance in terms of running. To do this, it is important that its proportion of filler is consistent with the proportion of filler of the second rubber composition. Thus, it is essential that the first composition comprises a proportion of reinforcing filler at least equal to 30 phr (parts of filler for 100 parts of elastomer) and at most equal to 80 phr. Also, in order that the proportion of filler of the two rubber compositions are consistent with one another, it is essential that the second composition comprises at least carbon black as reinforcing fillers, the carbon black having a proportion at least equal to 30 phr (parts of filler for 100 parts of elastomer) and at most equal to 75 phr, preferably at least equal to 40 phr. It is thus advantageous for the second rubber composition (222) to comprise a total proportion by weight of reinforcing filler at least equal to 40 phr.

To avoid the generation of heat, not only is it necessary for the first rubber composition to have a low dynamic loss but it is also preferable for it to comprise silica and carbon black as reinforcing fillers. This is because silica generates less heat for the same proportion of filler. This feature makes it more insulating but given the geometric position of the first rubber composition, already insulated by the second rubber composition from the largest zone of exchange with the exterior, specifically the tread surface, this has little influence.

To obtain the targeted balances, a preferred solution is that the first rubber composition is a rubber composition based on diene elastomers comprising at least one reinforcing filler comprising mainly carbon black with a STSA specific surface area (STSA standing for Statistical Thickness Surface Area, or determination of the surface area by the statistical thickness method) greater than 100 m2/g. A carbon black with a STSA specific surface area greater than 100 m2/g is a “fine” black, affording greater resistance to the spreading of cracks.

To obtain the targeted balances, a preferred solution is for the second rubber composition to be a rubber composition based on diene elastomers comprising at least one reinforcing filler, comprising mainly carbon black with a STSA specific surface area between 70 and 140 m2/g and a COAN (Compressed Oil Absorption Number) number between 85 and 105 ml/100 g, the composition comprises an oil in a proportion at most equal to 20 phr, and a tackifying resin (or specific hydrocarbon resin) in a proportion at most equal to 10 phr. Such a compound is more resistant to attacks and the rather fine black dispersing more evenly makes it possible to improve the conduction of heat to improve the discharge of heat energy and thus lower the temperature of the tread while the tire is being used.

The measurement of the STSA specific surface area, or fineness of the black, is well known to those skilled in the art of tires. It is taken on the compound taken as a sample from the tire, the test specimen being suitable for the measurement presented in the ASTM D-6556 standard. The oil absorption number of compressed test specimens of carbon black (COAN) is a measure of the ability of the carbon black to absorb liquids. This property is itself a function of the structure of the carbon black. The COAN number is determined by adapting the ISO 4656/2012 standard using an absorptometer with compressed test specimens of carbon black taken from test specimens taken from the tire.

The tackifying resin of use for the purposes of the invention may be selected from natural or synthetic resins. From among the synthetic resins, it may be preferably selected from among the thermoplastic hydrocarbon resins of aliphatic, or aromatic, or else of aliphatic/aromatic type, i.e. the hydrocarbon resins according to the invention comprise aliphatic units, or aromatic units, or else aliphatic units and aromatic units. Suitable aromatic monomers are, for example stirene, a-methylstirene, ortho-, meta- or para-methylstirene, vinyltoluene, para-(tert-butyl)stirene, methoxystirenes, chlorostirenes, vinylmesitylene, divinylbenzene, vinylnaphthalene or any vinylaromatic monomer derived from a $C_9$ fraction (or more generally from a $C_8$ to $C_{10}$ fraction). Preferably, the vinylaromatic monomer is stirene or a vinylaromatic monomer derived from a $C_9$ fraction (or more generally from a $C_8$ to $C_{10}$ fraction). Preferably, the vinylaromatic monomer is the minor monomer, expressed as a mole fraction, in the copolymer under consideration.

A second rubber composition of improved conductivity will be all the more effective if the void ratio of the tread is not zero. It is important that it remains low, specifically for the tread surface to have a void ratio by area of less than 1%, so as to not significantly reduce the volume of wearable rubber. An optimum void distribution is to have two narrow grooves so as to not reduce the volume of wearable rubber, passing around the tire, on either side of the median plane while zigzagging from the axial outside of the tread towards the median plane in order to discharge heat energy from all the zones of the tread, specifically the centre and the axial ends. More specifically, a preferred solution is that the tread comprises at least two narrow grooves passing around the tire, each narrow groove having a zigzagging overall shape of wavelength L and amplitude A, the wavelength L ranging between 10% and 120% of the axial width W of the tread, and the amplitude A ranging between 10% and 40% of this same axial width W, the tread surface having a void ratio by area of less than 1%. A narrow groove is understood to mean grooves which have a mean width of less than 10 mm.

Depending on the performance to be expected and the geometry selected for the radial thicknesses of the second and first rubber compositions, a preferred solution is that each zigzagging narrow groove has a maximum depth, at least equal to 20% and at most equal to 90% of the thickness E of the tread and preferably ranging between 40% and 70% of the thickness E.

The grooves have the disadvantage of increasing the flexibility of certain parts of the tread, as this can cause irregular wear of the tread. One solution for limiting this phenomenon is to place bridges in these grooves, in particular in the longitudinal or transverse parts. Thus, a preferred solution is for a plurality of bridges to be formed in the zigzagging narrow grooves, each bridge being formed from the bottom of the narrow grooves and locally decreasing the depth of these narrow grooves by at least 20% of the maximum depth of these narrow grooves.

BRIEF DESCRIPTION OF THE DRAWINGS

The features of the invention are illustrated in FIG. 1, which is schematic and not to scale, with reference to a tire of size 29.5R29 used in underground mines.

DETAILED DESCRIPTION OF THE DRAWINGS

FIG. 1 shows a volume view of an inventive variant of a tire according to the invention. In this variant, the tire 1 comprises a crown part 2 extended on each side by sidewalls 3, these sidewalls 3 ending in beads which have not been shown in this FIG. 1, and a carcass reinforcement 31 extending in the crown part 2, in the sidewalls 3, and in the beads. The median plane M is perpendicular to the axis of rotation YY' of the tire and passes through the middle of the tread 22 in FIG. 1.

The crown part 2 is radially surmounted on the outside by a tread 22 having a tread surface 10, a width W equal to 680 mm and a thickness E, in the median plane M, equal to the radial distance from the radially outermost point of the radially outermost crown layer (211) to the tread surface (10). The crown part 2 comprises a crown reinforcement 21 made up of several working layers 210 and a protective reinforcement 211 positioned radially on the outside of the working layers 210.

The tread 22 is formed by the superposition of two materials, a first rubber composition 221 and a second rubber composition 222, this second rubber composition 222 being located radially on the outside of the first rubber composition 221 so as to come into contact with the ground when the tire is new, this second rubber composition 222 having a mean radial thickness equal to 62.5 mm. The mean thickness of the first rubber composition 221 is equal to 62.5 mm and is intended to be worn away during running once the second layer 222 has been completely worn away.

The first rubber composition 221, which is situated radially on the inside of the second rubber composition 222, is chosen to have a low hysteresis value characterized by a tan δ value, this tan δ value being obtained under the conditions specified in the present document. In the disclosed embodiments of the invention, this low hysteresis should be associated with a high value for the elongation at break.

An intermediate layer 20 may be interposed between the crown reinforcement 21 and the tread 22; this intermediate layer has in particular the role of connecting the tread to the rest of the tire. The radial thickness of this intermediate layer represents less than 10% of the thickness E of the tread 22.

Two zigzagging narrow grooves 4, 5 having the same geometry are formed in this tread 22, by moulding, these zigzagging narrow grooves are continuous and pass all around the tire about its axis of rotation (indicated by the direction YY' in this FIG. 1). These zigzagging narrow grooves 4, 5 have the same maximum depth P equal to 70 mm and a mean width equal to 6 mm, this mean width being suitable for allowing the walls delimiting these zigzagging narrow grooves 4, 5 to come at least partially into contact with one another when the tire is running. The zigzagging narrow grooves are present when the tire is new in order to provide effective ventilation, and disappear as soon as the tread has a reduced thickness, and therefore has less of a tendency to heat up during running.

Each zigzagging narrow groove 4, 5 has a crenellated shape for which a wavelength L, here equal to 240 mm, and an amplitude A, equal to 300 mm, are defined.

By virtue of the presence of these two crenellated narrow grooves 4, 5, a surface for heat exchange with the surrounding air is created in the material, this heat exchange surface corresponding to the surface area of each of the walls that delimits a narrow groove. Each narrow-groove wall, when new, has a surface area which is approximately equal to five times the equivalent transverse surface area, viewed in section, of the tread, the latter transverse surface area being evaluated by multiplying the width W of the tread by the thickness E of wearable material.

In the first part of the wearing of the tire according to this variant, the radially outermost part of the tread is ventilated by the presence of these two zigzagging narrow grooves 4, 5, which have the ability to close up as they enter the contact patch, in order to maintain a suitable level of stiffness when new. After enough part-wear occurs that the zigzagging narrow grooves disappear, the good intrinsic qualities of the first rubber composition 221 provide the tire with good integrity.

The invention was tested or evaluated on tires of size 29.5R29. The tires according to the invention were compared with reference tires of the same size for each numerical evaluation. The tire is modelled by the finite element method and calculations are made at a load of 14 000 kg, at an inflation pressure of 4.5 bar. The calculation results below illustrate the invention. These results are expressed as the distance over time needed to reach a maximum temperature of 120° C., which is the temperature at which the risk of cracks developing significantly increases, at any location of the tread. Only the tread changes between the different tires; the crown reinforcements, the carcass reinforcements, the sidewalls and the beads are strictly identical between the reference tires and the different variants of the tires according to the invention.

The reference tires comprise:

a first rubber composition comprising 70 phr natural rubber and 30 phr stirene/butadiene (SBR) comprising 43 phr carbon black with a STSA specific surface area equal to 85 $m^2/g$ for an elongation at break of 460% at 100° C., a hysteresis equal to 0.08 at 100° C. for a secant tensile modulus E10_1 at 10% strain, measured at 23° C., of 5.1 MPa.

a second rubber composition comprising 20 phr natural rubber and 80 phr stirene/butadiene (SBR) comprising 65 phr carbon black with a STSA specific surface area equal to 125 $m^2/g$ and a COAN number equal to 95 ml/100 g and 16 phr tackifying oil, for an elongation at break of 551% at 100° C., a hysteresis equal to 0.25 at 100° C. and a secant tensile modulus E10_2 at 10% strain, measured at 23° C., of 5.0 MPa.

The tires according to the invention comprise:

a first rubber composition comprising 100 phr natural rubber, comprising 40 phr carbon black with a STSA specific surface area equal to 125 $m^2/g$ and 15 phr silica for an elongation at break of 625% at 100° C. and a hysteresis equal to 0.11 at 100° C., a secant tensile modulus E10_1 at 10% strain, measured at 23° C., of 5.2 MPa a second rubber composition comprising 100 phr stirene/butadiene (SBR) comprising 60 phr carbon black with a STSA specific surface area equal to 125 $m^2/g$ and a COAN number equal to 95 ml/100 g, and 11 phr tackifying oil, for an elongation at break of 362% at 100° C., a hysteresis equal to 0.22 at 100° C., for a secant tensile modulus E10_2 at 10% strain, measured at 23° C., of 5.7 MPa.

The reference tires make use of a technology with two rubber compositions, a first rubber composition of very low loss (0.08) with balanced mechanical performance between the breaking strength and the secant tensile modulus for such a hysteresis and a second rubber composition with a high elongation at break combined with an average secant tensile modulus for resisting attacks. The optimum distribution for this type of stack is about 20% of first rubber composition in the thickness of the tread.

For tires that are quite specific in terms of wear and thickness of the tread, the idea is to find a different balance by introducing silica into the fillers of the first rubber composition, lowering the hysteresis but improving the elongation at break, and increasing the secant modulus of the second rubber composition, lowering its elongation at break. Astonishingly, the design optimum value, for the crown temperature by varying the thickness of the first rubber composition in the tread, is considerably altered and a synergy between materials and balance between the thicknesses of the rubber compositions makes it possible to improve the performance. For a smooth tire without zigzagging narrow grooves, the optimum value for the temperature, strongly linked to the spreading of cracks, should be logically when the model only comprises the rubber composition of lowest hysteresis. In reality, the optimum value in this configuration, astonishingly, is when 66% of the tread is the first rubber composition. Above this optimum value, the thermal parameter decreases very slightly. However, above this optimum value, the resistance of the tire to attacks greatly decreases, notably owing to the modulus of the first rubber composition, which makes it less resistant to attacks. When more than 40% of the tread is the first rubber composition, the gain in thermal performance is about 40% compared to a tire where 100% of the tread is the second rubber composition. Between these two limits, as a function of the desired performance balance, the tire according to the invention is still better in terms of resistance to attacks and in terms of spreading of cracks than the tires of the prior art are.

For tires provided with narrow grooves as described, the optimum value in terms of temperature is no longer when 66% of the tread is the first rubber composition but when 50% of the tread is first rubber composition, and the performance decreases by more than 10% in relation to this optimum value for a tire comprising only the first rubber composition. Astonishingly, the interaction between the tread pattern and the makeup of the tread makes it possible to find an optimum value that is shifted as a function of the proportion of the first rubber composition compared to a tire without narrow grooves. The heat exchange effect is optimized by virtue of the narrow grooves for the second rubber composition comprising carbon black as filler, which supersedes the generation of heat energy, but also by virtue of the decrease in heat exchange for a material of lower hysteresis comprising silica, which also has an effect of decreasing the heat exchanges. The specific features of the tread, that it has a very high thickness and very low void ratio, make this optimum value entirely specific. The optimum value for a tire according to the invention with a tread pattern having narrow grooves with 50% of the first rubber composition makes it possible to improve the thermal performance by almost:

80% compared to a tire without narrow grooves of which 100% of the tread is made up of the second rubber composition 20% compared to a tire without narrow grooves of which 100% of the tread is made up of the first rubber composition 22% compared to a tire without narrow grooves of which 66% of the tread is made up of the first rubber composition, which offers the optimum performance for a tire without narrow grooves.

Around this optimum value at 50%, for a proportion of first rubber composition ranging between 40% and 66% of the thickness of the tread, the gain in thermal performance is greater than 70% compared to a tire without narrow grooves of which 100% of the tread is made up of second rubber composition. With preference for a proportion of first rubber composition ranging between 45% and 60% of the thickness of the tread, the gain in thermal performance is greater than 75% compared to a tire without narrow grooves of which 100% of the tread is made up of second rubber composition.

Through expert knowledge and tests carried out on mining sites, the tires according to the invention, owing to the high tensile modulus of their second rubber composition, will have an improved resistance to attacks by 10% to 20% compared to the reference tires. Similarly by virtue of the improvement in the elongation at break, compared to the composition of the reference tires, of the first rubber composition in spite of the adversely affected hysteresis, the tires according to the invention will have improved performance in terms of resistance to cracking by about 20%.

10 The invention thus makes it possible to find a largely improved balance between the thermal performance, cracking performance and performance in terms of chunking of parts of the tread compared to the tires of the prior art.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A radial tire for a mining vehicle, intended to be mounted on a rim having a rim diameter at least equal to 24 inches and to bear a nominal load at least equal to 8000 kg, comprising:

a tread intended to come into contact with the ground via a tread surface and connected by two sidewalls to two beads intended to come into contact with the rim, a crown reinforcement, radially on the inside of the tread, comprising crown layers comprising metallic reinforcers, a median plane (M), which is perpendicular to the axis of rotation of the tire, passes through the middle of the tread, and has intersection points with the tread surface that are at a mean distance from the axis of rotation of the tire equal to Rm, the tread having an axial width (W) and having, in the median plane (M), a radial thickness (E), defined as the radial distance from the radially outermost point of the radially outermost crown layer to the tread surface, the radial thickness E of the tread being at least equal to 0.04*Rm, the tread comprising at least a first rubber composition and a second rubber composition, making up at least 90% of the thickness (E) of the tread, the first rubber composition being radially on the inside of the second rubber composition,. the second rubber composition having a secant tensile modulus E10_2, measured at 10% strain and at a temperature of 23° C., at least equal to 5.2 MPa, wherein, the first rubber composition makes up at least 40% and at most 66% of the thickness (E) of the tread, the elongation at break at 100° C. of the first rubber composition is at least equal to 500%, and the maximum dynamic loss tanδ of said first rubber composition, measured at a temperature of 100° C. and a frequency of 10 Hz, is at most equal to 0.13, the first rubber composition comprises a proportion by weight of reinforcing filler at least equal to 30 phr (parts of filler for 100 parts of elastomer) and at most equal to 80 phr, the second rubber composition comprises carbon black having a proportion by weight at least equal to 30 phr and at most equal to 75 phr, the total proportion by weight of reinforcing fillers of the second rubber composition is greater than the total proportion by weight of reinforcing fillers of the first rubber composition, and wherein the tread further comprises at least two narrow grooves passing around the tire, each narrow groove having a zigzagging overall shape of wavelength L and amplitude A, the wavelength L ranging between 10% and 120% of the axial width (W) of the tread, and the amplitude A ranging between 10% and 40% of this same axial width (W), the tread surface having a void ratio by area of less than 1%.

2. The tire according to claim 1, wherein the first rubber composition makes up at least 45% and at most 60% of the thickness (E) of the tread.

3. The tire according to claim 1, wherein the first rubber composition comprises silica and carbon black as reinforcing fillers.

4. The tire according to claim 1, wherein the elongation at break at 100° C. of the first rubber composition is at least equal to 575%.

5. The tire according to claim 1, wherein the first rubber composition is a rubber composition based on diene elastomers, comprising at least one reinforcing filler comprising mainly carbon black with a STSA specific surface area greater than 100 $m^2/g$.

6. The tire according to claim 1, wherein the second rubber composition is a rubber composition based on diene elastomers comprising at least one reinforcing filler, said reinforcing filler comprising mainly carbon black having a STSA specific surface area ranging between 70 and 140 $m^2/g$ and a COAN number ranging between 85 and 105 ml/100 g, the second rubber composition comprising an oil in a proportion at most equal to 20 phr and a tackifying resin in a proportion at most equal to 10 phr.

7. The tire according to claim 1, wherein the second rubber composition comprises a total proportion by weight of reinforcing filler at least equal to 40 phr.

8. The tire according to claim 1, wherein each zigzagging narrow groove has a maximum depth (P) at least equal to 20% and at most equal to 90% of the thickness (E) of the tread.

9. The tire according to claim 1, wherein a plurality of bridges are formed in the zigzagging narrow grooves, each bridge being formed from the bottom of the narrow grooves and locally decreasing the depth of these narrow grooves by at least 20% of the maximum depth of these narrow grooves.

10. The tire according to claim 1, wherein each zigzagging narrow groove has a maximum depth (P) ranging between 40% and 70% of the thickness (E).

* * * * *